(12) United States Patent
Takayasu

(10) Patent No.: US 6,594,747 B2
(45) Date of Patent: Jul. 15, 2003

(54) PROCESSING APPARATUS WITH INTEGRATED CIRCUIT AND INTEGRATED CIRCUIT PACKAGE

(75) Inventor: Mitsuru Takayasu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 09/733,910

(22) Filed: Dec. 12, 2000

(65) Prior Publication Data

US 2002/0016894 A1 Feb. 7, 2002

(30) Foreign Application Priority Data

Jun. 29, 2000 (JP) ........................................ 2000-196487

(51) Int. Cl.[7] ............................................. G06F 12/00
(52) U.S. Cl. .................... 711/163; 711/100; 711/154
(58) Field of Search .............................. 711/1, 2, 100, 711/102, 104, 154, 163; 380/3, 25

(56) References Cited

U.S. PATENT DOCUMENTS

| | | | | |
|---|---|---|---|---|
| 5,467,457 A | * | 11/1995 | Kohda et al. ................ | 711/102 |
| 5,781,627 A | * | 7/1998 | Ikuta et al. .................... | 380/3 |
| 5,841,870 A | * | 11/1998 | Fieres et al. ................... | 380/25 |
| 6,353,890 B1 | * | 3/2002 | Newman ..................... | 713/193 |
| 6,421,308 B1 | * | 7/2002 | Kizu et al. ............... | 369/53.17 |

FOREIGN PATENT DOCUMENTS

| JP | A-8-190509 | 7/1996 |
|---|---|---|
| JP | A-11-175334 | 7/1999 |

* cited by examiner

*Primary Examiner*—Tuan V. Thai
(74) *Attorney, Agent, or Firm*—Arent Fox Kintner Plotkin & Kahn, PLLC

(57) ABSTRACT

The present invention relates to a processing apparatus and the like including an internal circuit having a CPU executing a program and an internal memory storing an internal program, and an external memory provided exteriorly of the internal circuit and storing an external program. The present invention intends to prevent the illicit interpretation and interpolation of programs and data.

An internal circuit 10 mounted on an LSI 100 includes an address controller 106 monitoring whether or not an address on bus lines 111 and 112 is in a predetermined address region while a CPU 101 is executing a program stored in an external memory 20, and notifying the CPU when detecting the address in the predetermined address region.

8 Claims, 3 Drawing Sheets

PROCESSING APPARATUS WITH INTEGRATED CIRCUIT AND INTEGRATED CIRCUIT PACKAGE

BACKGROUND OF THE INVENTION

1. Field of the Invention

The present invention relates to a processing apparatus comprising a CPU executing a program, an internal circuit having an internal memory storing internal programs, and an external memory storing external programs, an integrated circuit wherein the CPU and the internal memory are integrated on one chip and the external memory can be provided exteriorly of the integrated circuit, and an integrated circuit package to which the chip on which such an integrated circuit is mounted, is molded.

2. Description of the Related Art

With the recent development of LSI technique, a CPU executing programs, a memory in which the programs executed by the CPU are stored and other various functional modules can be integrated on one chip, which contributes greatly to making an apparatus small in size, cost reduction and the like. To manufacture such an LSI, a memory storing programs may be mounted on an LSI chip in case of a system which executes the same program irrespectively of users and which does not need to change programs after completion. However, if it is necessary to execute different programs according to users or to change a program while the program is in use, then it is desirable to constitute an LSI so that an external memory can be further provided exteriorly of the LSI having the above constitution and to store programs which may be possibly changed while in use or programs which differ according to users in the external memory.

Meanwhile, in case of the system capable of adding the above-stated external memory exteriorly of the LSI, there is a probability that the content of the external memory is illicitly rewritten (programmed) or the external memory is replaced by a memory storing an illicit program and having the same specification as that of the external memory, with the result that important programs or data stored in the internal memory are illicitly accessed and the contents of the programs or data are illicitly interpreted. The following is one example of this case.

Recently, IC cards and magnetic cards each having a cash value or a point value corresponding to a cash as data is spreading increasingly. Following this, data protection becomes considerably significant so as to prevent the fabrication or falsification of cards. To do so, as shown in, for example, Japanese Patent Application Laid-Open No. 2916338, the protection of a card itself from being accessed is proposed. However, the write and read of card data are conducted through a card processing apparatus. Due to this, if the card processing apparatus illicitly interprets data or a program, the protection of a card itself becomes imperfect even if such protection is made.

The above-stated system in which an external memory is provided exteriorly is also desired as a card processing apparatus. The problem with the system is how to prevent illicit access.

BRIEF SUMMARY OF THE INVENTION

The present invention has been made in view of the above circumstances. It is, therefore, an object of the present invention to provide a processing apparatus, an integrated circuit and an integrated circuit package capable of preventing illicit access by the execution of a program in an external memory.

To attain the above object, a processing apparatus according to the present invention is characterized by comprising:

an internal circuit, the internal circuit including a CPU executing a program; an internal memory storing an internal program; a bus line connecting the CPU to the internal memory, extending externally and transmitting an address and data; and a scramble section provided at an outlet and inlet of the bus line to an exterior and scrambling at least the data out of the address and the data on the bus line; and an external memory provided exteriorly of an externally extending portion of the bus line and storing an external program, wherein the internal circuit further includes an address controller monitoring whether the address on the bus line is an address in a predetermined address region while the program stored in the external memory is being executed, and notifying the CPU when detecting the address in the predetermined region.

The processing apparatus according to the present invention has the internal circuit which includes the address controller as stated above. Due to this, even if the program stored in, for example, the external memory is illicitly replaced by another program, important programs and data are stored in the predetermined address region and the CPU is notified when the address region is accessed from externally. This allows the CPU to take measures including invalidating the access in response to the notification, completely stopping the execution of the program stored in the external memory and notifying the exterior of the CPU of such illicit access.

In the processing apparatus according to the present invention, the CPU may typically prohibit access to the address detected by the address controller when notified by the address controller.

Further, in the processing apparatus according to the present invention, the internal memory may include an ROM; and the address controller may monitor whether the address on the bus line is an address in a part of address regions allotted to the ROM. In that case, the ROM preferably store an OS program in a part of the address region monitored by the address controller among the address regions allotted to the ROM.

The OS (operation system) program serves to control the overall processing apparatus and it is, therefore, quite significant that the OS program is not illicitly accessed.

Moreover, in a processing apparatus according to the present invention, it is preferable that the internal memory includes an ROM and an RAM; and the address controller monitors whether the address on the bus line is an address in at least a part of address regions allotted to the ROM and monitors whether the address on the bus line is an address in at least a part of address regions allotted to the RAM.

By doing so, it is possible to protect readable and writable data stored in the RAM from being illicitly accessed from externally.

Further, to attain the above object, an integrated circuit is characterized by being constituted by integrating, on one chip, a CPU executing a program; an internal memory storing an internal program; a bus line connecting the CPU to the internal memory, extending externally, having an externally extending portion of which an external memory storing an external program is provided exteriorly, and transmitting an address and data; a scramble section provided at an outlet and inlet of the bus line to an exterior and scrambling at least the data out of the address and the data on the bus line; and an address controller monitoring whether the address on the bus line is an address in a predetermined address region while the program stored in the external memory is being executed, and notifying the CPU when detecting the address in the predetermined region.

The integrated circuit according to the present invention has the above-stated constitution, provides the equivalent function and advantage to those of the processing apparatus according to the present invention. In addition, since the integrated circuit according to the present invention is mounted on one chip(LSI), it is difficult to inspect and examine the circuit arrangement or electric voltage output of the LSI without employing a high magnification microscope and a fine machining device. In this respect, too, the integrated circuit according to the present invention can prevent the interpretation and interpolation of data.

In the integrated circuit according to the present invention, the CPU may typically prohibit access to the address detected by the address controller when notified by the address controller as in the case of the above-stated processing apparatus according to the present invention.

Further, in the integrated circuit according to the present invention, the internal memory may includes an ROM; and the address controller may monitors whether the address on the bus line is an address in a part of address regions allotted to the ROM. In that case, the ROM preferably stores an OS program in a part of the address region monitored by the address controller among the address regions allotted to the ROM.

Moreover, in a processing apparatus according to the present invention, it is preferable that the internal memory includes an ROM and an RAM; and the address controller monitors whether the address on the bus line is an address in at least a part of address regions allotted to the ROM and monitors whether the address on the bus line is an address in at least a part of address regions allotted to the RAM.

Additionally, to attain the above object, an integrated circuit package according to the present invention is characterized by being constituted by integrating, on one chip, a CPU executing a program; an internal memory storing an internal program; a bus line connecting the CPU to the internal memory, extending externally, having an externally extending portion of which an external memory storing an external program is provided exteriorly, and transmitting an address and data; a scramble section provided at an outlet and inlet of the bus line to an exterior and scrambling at least the data out of the address and the data on the bus line; and an address controller monitoring whether the address on the bus line is an address in a predetermined address region while the program stored in the external memory is being executed, and notifying the CPU when detecting the address in the predetermined region and molding the one chip.

The integrated circuit package according to the present invention is constituted by molding the integrated circuit according to the present invention (LSI). Thus, in addition to the equivalent function and advantage to those of the LSI according to the present invention, it is possible to make it more difficult to contact with circuit parts such as the internal bus line by molding the circuit. It is almost impossible to inspect and examine the electric voltage output of the LSI. Besides, it is possible to further ensure preventing the interpretation and interpolation of internal data.

DESCRIPTION OF THE PREFERRED EMBODIMENTS

Figure 1:
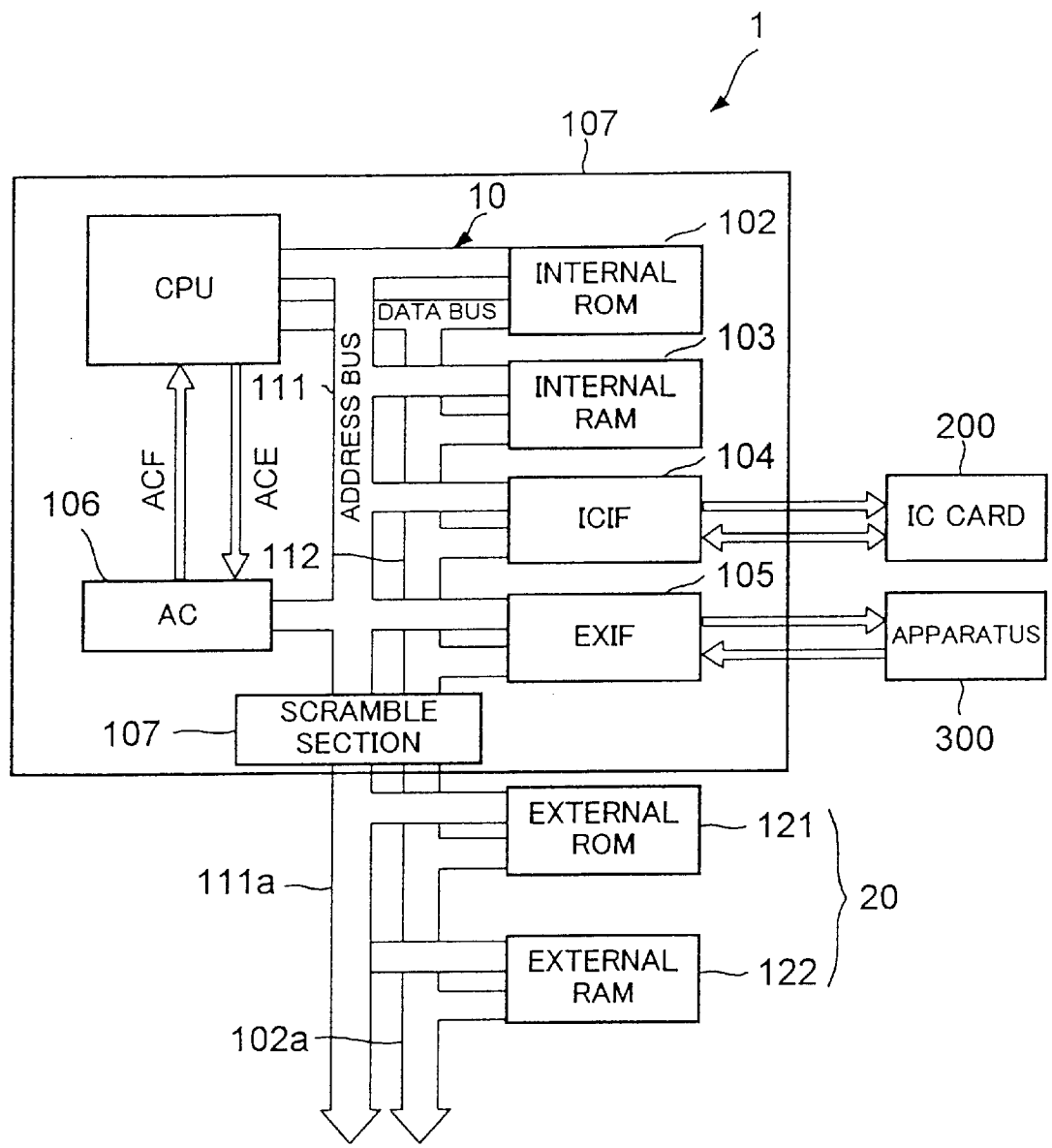
FIG. 1 is a block diagram showing the constitution of one embodiment of a processing apparatus according to the present invention.

FIG. 1 is a circuit block diagram showing the constitution of one embodiment of a processing apparatus according to the present invention. The embodiment shown therein has a constitution as a card processing apparatus accessing an IC card.

A card processing apparatus 1 shown in FIG. 1 consists of an internal circuit 10 and an external memory 20 provided exteriorly. The internal circuit 10 is mounted on one LSI chip 100. This LSI chip 100 is also one embodiment of an integrated circuit according to the present invention.

The internal circuit 10 mounted on the LSI chip 100 comprises a CPU 101, an internal ROM 102 an internal RAM 103 an IC card interface (ICIF) 104 an external interface (EXIF) 105 and an address controller (AC) 106. These constituent elements are mutually connected by an address bus 111 and a data bus 112. The address bus 111 and the data bus 112 extend to the exterior of the LSI chip 100 through a scramble section 107 arranged at outlets/inlets to/from the exteriors of the address bus 111 and the data bus 112. The external memory 20, which consists of an external ROM 121 and an external RAM 122, is connected to the exteriorly extending portions 111a and 112a of the address bus 111 and the data bus 112, respectively.

Here, the CPU 101 serves to execute programs stored in the internal ROM 102 and programs stored in the external ROM 121.

The internal ROM 102 and the internal RAM 103 are one example of an internal memory according to the present invention. Out of the ROM 102 and RAM 103 the internal ROM 102 stores therein an initial start software starting at an initial start address when power is turned on, an OS (operation system) software, a driver software for IC card processing, a driver software for the external interface 105 and the like. There exist a plurality of types of communication commands between IC cards such as, for example, IS 07816 T1 and T0. In this embodiment, a plurality of types of driver software for IC card processing are stored in the internal ROM 102 so that the processing apparatus can selectively use and access a plurality of types of IC cards 200 through the IC card interface 104 at need.

In this embodiment, at least two types of driver software (which will be referred to as "IC-T1" and "IC-T0", respectively) for accessing an IC card according to the communication commands compliant with the respective standards of ISO7816 T1 and T0, are stored in the internal ROM 102.

Further, a host apparatus 300 which controls, as a host, this card processing apparatus 1, is connected to the external interface 105. The external interface driver software stored in the internal ROM 102 takes charge of the communication between the processing apparatus 1 and the host apparatus 300 through the external interface 105. As the external interface driver software, a plurality of types of driver software including, for example, a driver software for a transmission speed of 9600 bps, that for 19200 bps and the like, are stored in the internal ROM 102 and selectively used at need. In this embodiment, at least two types of driver software, i.e., a driver software for a transmission speed of 9600 bps (which will be referred to as "EX-9600" and that for a transmission speed of 19200 bps (which will be referred to as "EX-19600"), are stored in the internal ROM 102.

The internal RAM 103 is used as an operation region when the CPU 101 executes a program, to temporarily store data which is being processed.

In addition, application software for selecting one of the plural driver software IC-T=1 and IC-T0 for IC card access and for selecting one of the plural driver software EX-9600 and EX-19600 for the external interface 105 are stored in the external ROM 121. It is also possible to store an application software for controlling a display equipment, which is not shown, in the external ROM 121.

The external RAM 122 is used as an operation region when executing an application program stored in the external ROM 121.

In this embodiment, addresses are allotted to the internal ROM 102 the internal RAM 103 the external ROM 121 and the external RAM 122 as shown in Table 1 below.

TABLE 1

| Item | Address Region |
| --- | --- |
| Internal ROM | 00010000-0002FFFF |
| Internal RAM | 00030000-0004FFFF |
| External ROM | 00050000-0006FFFF |
| External RAM | 00070000-0008FFFF |

Figure 2:
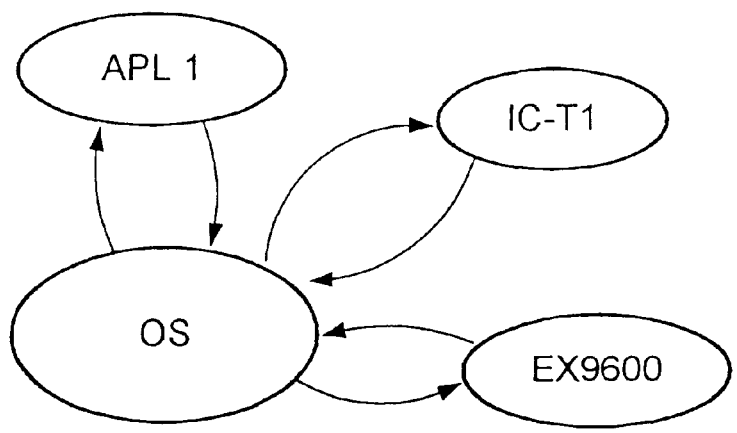
FIG. 2 is a program flow chart in a card processing apparatus 1 shown in FIG. 1.

FIG. 2 is a program flow chart for the card processing apparatus 1 shown in FIG. 1.

In FIG. 2, "OS", "IC-T1" and "EX-9600" denote the OS software, one of the plural types of driver software for IC card access and one of the plural types of driver software for communicating with the host apparatus through the external interface 105, respectively, all of which software are stored in the internal ROM 102. "APL1" denotes the application software stored in the external ROM 121.

"APL1", "IC-T1" and "EX-9600" communicate only with the OS software for the transmission of information and the like and they do not communicate with one another. This is true for a case where software other than the software shown in FIG. 2 are executed. Namely, the software communicate only with the OS software.

In this embodiment, a software system is constructed as described above and illicit access to the OS software is prohibited as will be described later, whereby illicit interpretation and interpolation can be prevented even if the external ROM 121 is replaced by an ROM storing an illicit application software.

Next, the function of the scramble section 107 will be described.

Figure 3:
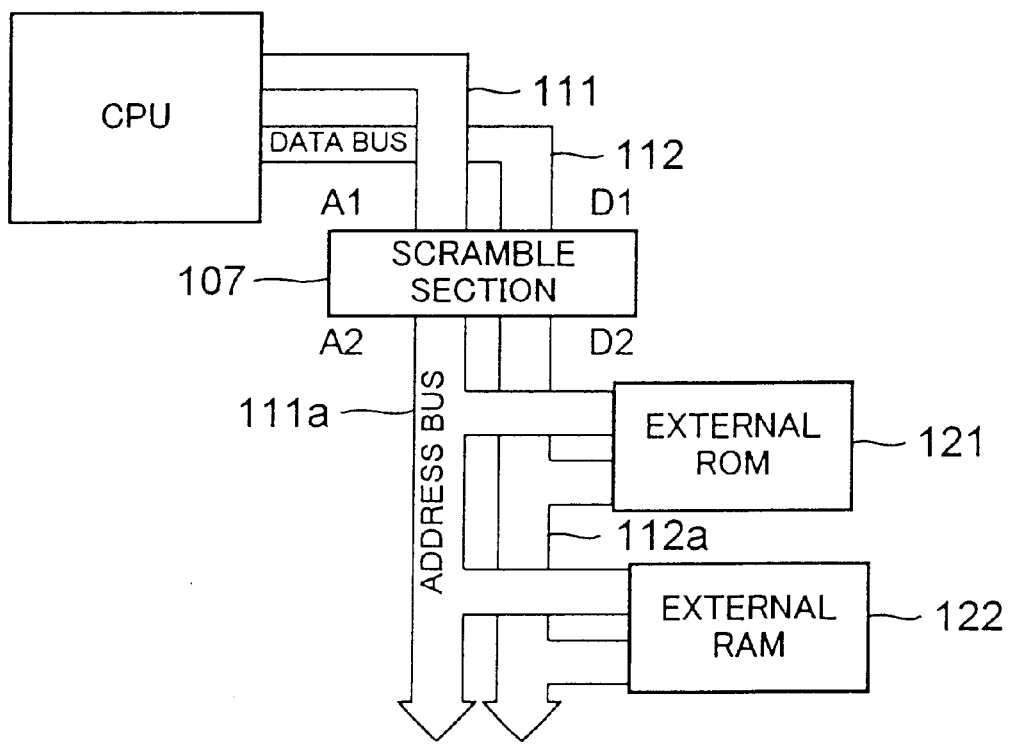
FIG. 3 is an explanatory view for the function of a scramble section.

FIG. 3 is an explanatory view for the function of the scramble section 107.

In this scramble section 107, scrambling shown in Table 2 below is conducted for addresses and data, respectively.

TABLE 2

| Item | Conversion from A1 to A2 | |
| --- | --- | --- |
| A1 | 0005XXXX | |
| A2 | 000AXXXX | |
| Item | Conversion from D1 to D2 | Conversion from D2 to D1 |
| A1 | XXXXXXXX | XXXXXXXX |
| A2 | XXXXXXXX | XXXXXXXX |

In Table 2 above, X denotes an arbitrary hexadecimal. The scramble section 107 converts a hexadecimal in the fifth place of an address A1 outputted from the CPU 101 to a complement. Table 2 shows a case where 5 in hexadecimal in the fifth place of the address A1 is converted to A by scrambling and the address A1 is thereby converted to address A2. As for data on the data bus, hexadecimal numbers in all eight places are converted to complements, whereby internal data D1 is converted to external data D2 and the external data D2 is converted to the internal data D1.

It is noted that the above description is only an example of scrambling and that scrambling algorithms in the scramble section of the present invention should not be limited to the above algorithm. Further, in this embodiment, the scramble section scrambles both addresses and data. However, it is not necessarily requisite to conduct scrambling for both addresses and data according to the present invention and only data may be scrambled.

Returning to FIG. 1, the address controller AC will be described.

When executing the application software stored in the external ROM 121, the CPU 101 transmits an ACE signal of logic 1 indicating that the software stored in the external ROM 121 is executed, to the address controller or AC 106. The address controller 106 monitors the address bus 111 to judge whether or not an address on the address bus 111 is within a predetermined address region preset in advance.

In this embodiment, the address controller 106 monitors the address bus to judge whether or not an address on the address bus 111 is XXX2XXXX in hexadecimal.

Here, the OS software is stored in the address region XXX2XXXX of the internal ROM 102.

To be specific, the address controller 106 monitors four bits in hexadecimal in the fifth place, detects whether or not the four bits are coincident with a four-bit pattern "0010" and, if coincident, obtains a signal AC4 of logic 1. If both the signal AC4 and the ACE signal received from the CPU 101 are logic 1, an interrupt signal ACF of logic 1 is outputted to the CPU 101. Namely, this interrupt signal ACF represents that an address in the predetermined address region of the internal ROM 102 is accessed while the program stored in the external ROM 121 is being executed. When the CPU 101 receives the interrupt signal ACF, a preset interruption program within the OS is started. Then, the CPU 101 recognizes that the address is illicitly accessed from externally, prohibits the access and executes a processing which has been preset for any possible illicit access.

As shown in Table 1, addresses 00010000 to 0002FFFF in hexadecimal representation are allotted to the internal ROM 102. In this embodiment, all address regions of the internal ROM 102 are not prohibited from being accessed but the address regions 00010000 to 0001FFFF are accessible from externally.

Further, while the program stored in the internal ROM 102 is being executed, the logic of the ACE signal outputted from the CPU 101 to the address controller 106 becomes 0. In this case, even if the address controller 106 detects an address in the preset address region, an interrupt signal ACF is not transmitted to the CPU 101. Therefore, when the program stored in the internal ROM 102 is executed, all address regions of the internal ROM 102 are accessible.

In the above embodiment, the address controller 106 detects the address region XXX2XXXX in hexadecimal representation, i.e., a part of the address regions of the internal ROM 102. Alternatively, both a part of the address regions of the internal ROM 102 and a part of the address regions of the internal RAM 103 may be detected by, for example, detecting address regions XXX2XXXX and XXX4XXXX in hexadecimal representation. By creating a program so that the data prohibited from being inadvertently leaked out, among the data stored in the internal RAM 103 while a program is being executed, are stored in the address region XXX4XXXX, it is possible to prevent illicit data read. Besides, in this embodiment, only a part of the address regions of the internal ROM 101 or the internal RAM 103 is detected. Alternatively, the address controller 106 may detect either all address regions of the internal ROM 101 or those of the internal RAM 103 or both of them.

In this embodiment, the internal circuit 10, among the constituent elements of the data processing apparatus 1 shown in FIG. 1, is mounted on one LSI chip 100. Due to this, without employing a high magnification microscope and a fine machining device, it is difficult to inspect and examine the circuit arrangement of an LSI or the electronic voltage output thereof. In this respect, too, this embodiment prevents the illicit interpretation and interpolation of data or programs.

Figure 4:
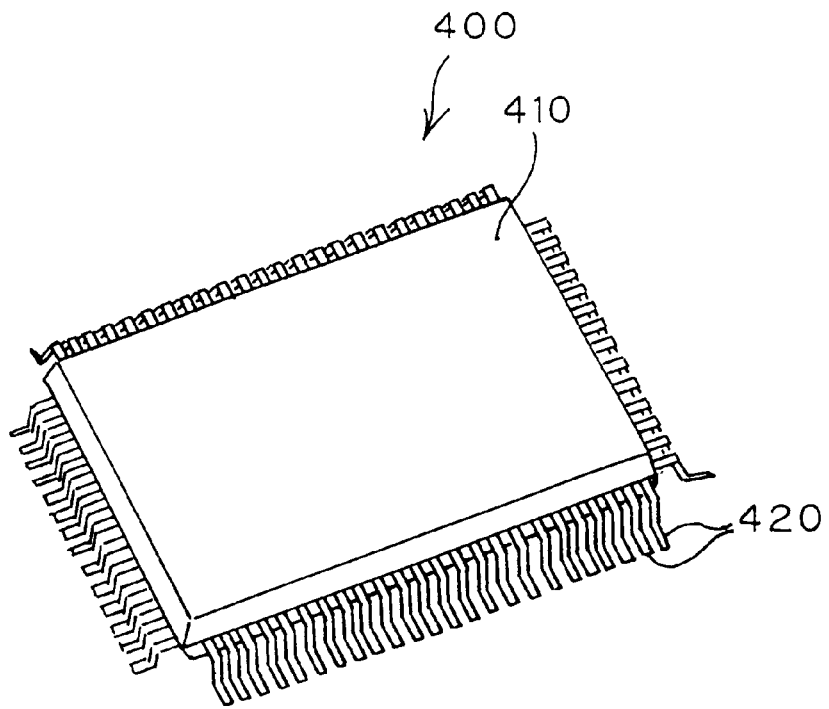
FIG. 4 is an outside perspective view of one embodiment of an integrated circuit package according to the present invention.
Figure 5:
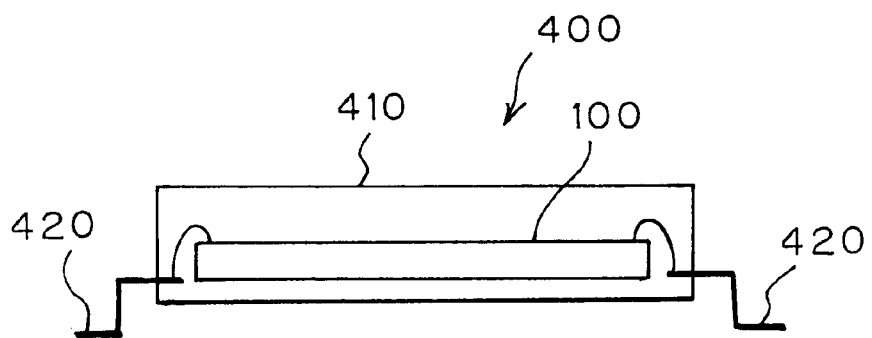
FIG. 5 is a typical cross-sectional view of the integrated circuit package shown in FIG. 4.

FIG. 4 is an outside perspective view of one embodiment of an integrated circuit package according to the present invention. FIG. 5 is a typical cross-sectional view of the integrated circuit package.

In an integrated circuit package 400, an LSI chip 100 having a circuit arrangement shown in FIG. 1 is provided inside. The periphery of the chip 100 is completely molded by a non-conductive synthetic resin 410 ($10^7 \Omega/cm$ or higher) and only connection terminals 420 are exposed externally of the mold. By molding the LSI chip 100 with electric insulating material, it becomes more difficult to contact with circuit parts such as an internal bus line and it becomes, therefore, almost impossible to inspect and examine the electric voltage output of the LSI. Thus, it is possible to further ensure preventing the interpretation and interpolation of internal data.

What is claimed is:

1. A processing apparatus comprising:

an internal circuit, said internal circuit including a CPU executing a program; an internal memory storing an internal program; a bus line connecting said CPU to said internal memory, extending externally and transmitting an address and data; and a scramble section provided at an outlet and inlet of said bus line to an exterior and scrambling at least the data out of the address and the data on the bus line; and an external memory provided exteriorly of an externally extending portion of said bus line and storing an external program, wherein said internal circuit further includes an address controller monitoring whether the address on said bus line is an address in a predetermined address region while the program stored in said external memory is being executed, and notifying said CPU when detecting the address in the predetermined region.

2. A processing apparatus according to claim 1, wherein said CPU prohibits access to the address detected by said address controller when notified by said address controller.

3. A processing apparatus according to claim 1, wherein said internal memory includes an ROM; and said address controller monitors whether the address on the bus line is an address in a part of address regions allotted to the ROM.

4. A processing apparatus according to claim 1, wherein said internal memory includes an ROM and an RAM;

said address controller monitors whether the address on the bus line is an address in at least a part of address regions allotted to the ROM and monitors whether the address on the bus line is an address in at least a part of address regions allotted to the RAM.

5. An integrated circuit constituted by integrating, on one chip, a CPU executing a program; an internal memory storing an internal program; a bus line connecting said CPU to said internal memory, extending externally, having an externally extending portion of which an external memory storing an external program is provided exteriorly, and transmitting an address and data; a scramble section provided at an outlet and inlet of said bus line to an exterior and scrambling at least the data out of the address and the data on the bus line; and an address controller monitoring whether the address on said bus line is output as an address in a predetermined address region while the program stored in said external memory is being executed, and notifying said CPU when detecting the address in the predetermined region.

6. An integrated circuit according to claim 5, wherein said CPU prohibits access to the address detected by said address controller when notified by said address controller.

7. An integrated circuit according to claim 5, wherein said internal memory includes an ROM; and said address controller monitors whether the address on the bus line is an address in a part of address regions allotted to the ROM.

8. An integrated circuit package constituted by integrating, on one chip, a CPU executing a program; an internal memory storing an internal program; a bus line connecting said CPU to said internal memory, extending externally, having an externally extending portion of which an external memory storing an external program is provided exteriorly, and transmitting an address and data; a scramble section provided at an outlet and inlet of said bus line to an exterior and scrambling at least the data out of the address and the data on the bus line; and an address controller monitoring whether the address on said bus line is an address in a predetermined address region while the program stored in said external memory is being executed, and notifying said CPU when detecting the address in the predetermined region and molding the one chip.

\* \* \* \* \*